United States Patent [19]
Marietta

[11] 3,816,065
[45] June 11, 1974

[54] GAS TORCHES

[75] Inventor: Cesar Marietta, Saint Leu La Foret, France

[73] Assignee: Anciens Etablissements Leon Guilbert & Fils, Paris, France

[22] Filed: Oct. 30, 1972

[21] Appl. No.: 301,803

[30] Foreign Application Priority Data
Feb. 17, 1972 France .............................. 72.05307

[52] U.S. Cl. ................ 432/183, 239/450, 239/565
[51] Int. Cl. ........................................... F23d 13/26
[58] Field of Search .......... 239/565, 556, 450, 557; 431/328, 329; 432/183, 224

[56] References Cited
UNITED STATES PATENTS
| | | | |
|---|---|---|---|
| 1,044,131 | 11/1912 | Brown | 239/556 |
| 1,066,869 | 7/1913 | Walker | 432/183 |
| 1,345,188 | 6/1920 | Howlett | 432/183 |
| 1,499,202 | 6/1924 | Coutu | 239/565 |

FOREIGN PATENTS OR APPLICATIONS
483,568  8/1953  Italy .................................. 239/565

Primary Examiner—Carroll B. Dority, Jr.
Attorney, Agent, or Firm—Young & Thompson

[57] ABSTRACT

A gas-flame or hot-gas torch specially designed for uniformly heating the entire periphery of tubes, sections or the like, especially for the purposes of brazing or annealing, in the form of a fork-shaped device comprising a main gas-supply conduit and two lateral arms, with a flame-distributor nozzle incorporated in each of said arms, the latter each having a general curvilinear enveloping shape with an internal wall constituted by the flame distributor nozzle, the extremities of the distributors adjacent to the main gas conduit having a transverse direction with respect to the said conduit, while the extremities of the distributors farthest away from the main gas conduit have a substantially longitudinal direction with respect to the said main conduit, the external walls of said arms, remote from said main conduit, having a substantially transverse direction with respect to the said conduit.

5 Claims, 6 Drawing Figures

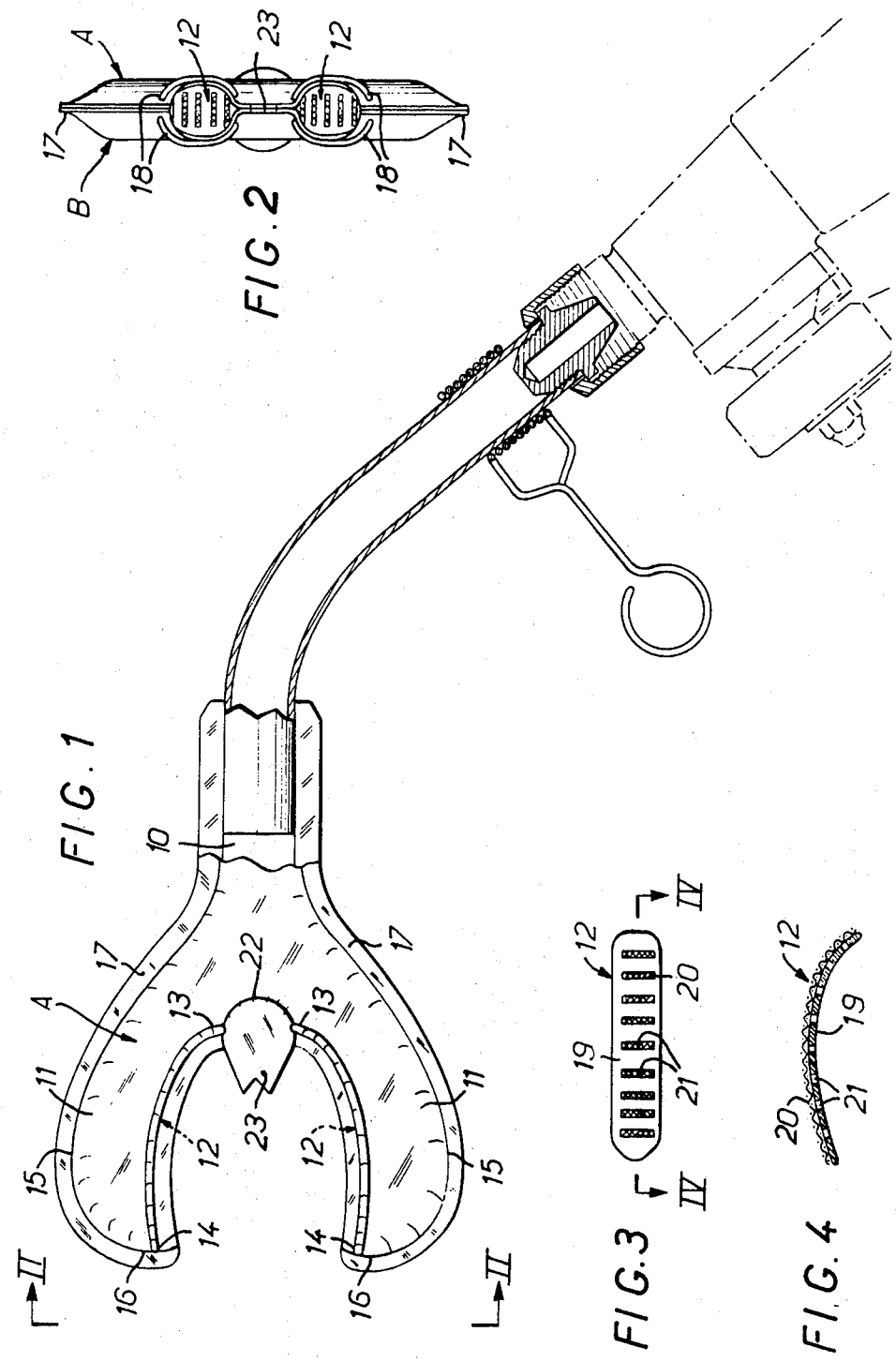

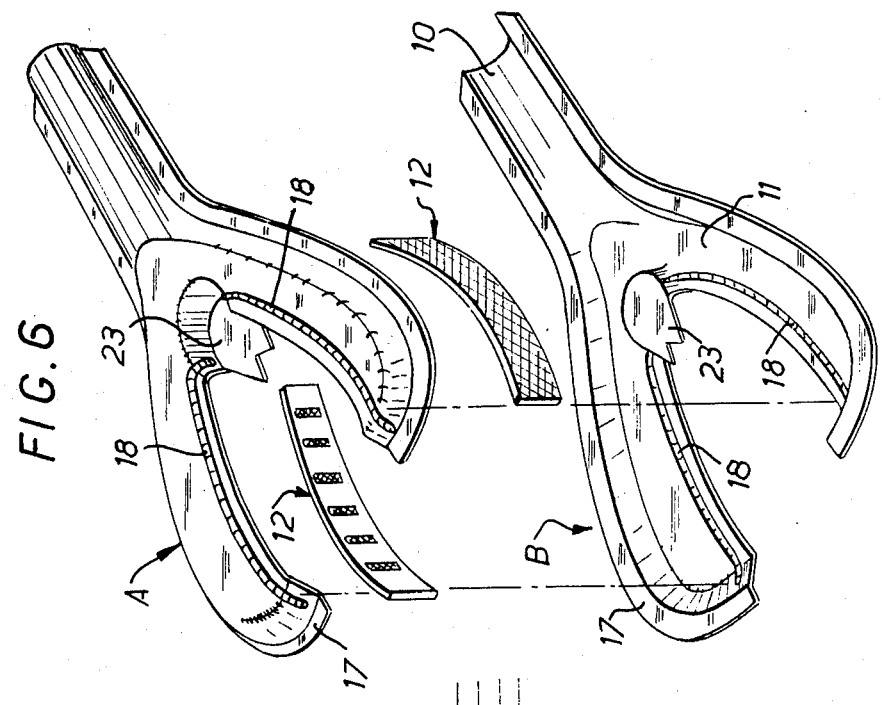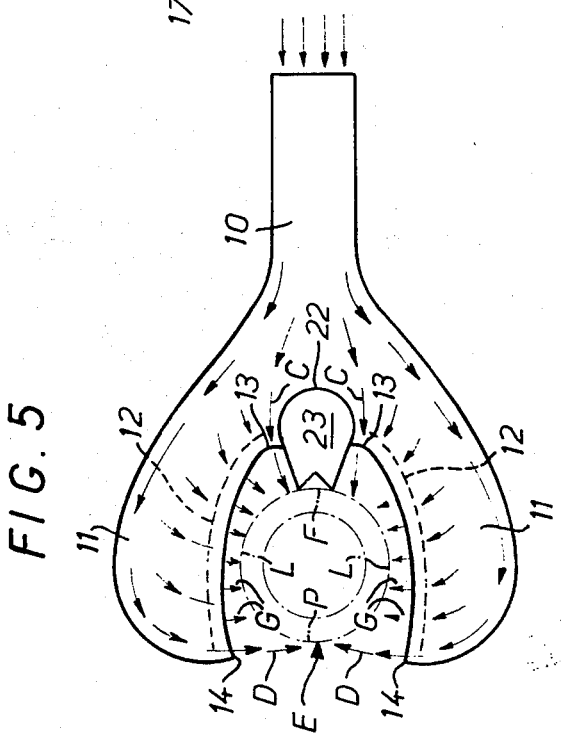

3,816,065

GAS TORCHES

The present invention relates to a torch having a gas flame or working with hot air, in the form of a fork with two arms comprising a main supply conduit and two side arms provided with nozzle means for treating an element such as a tube or a profile section engaged between the two arms.

As a general rule, in torches of this kind, each nozzle means of a lateral arm consists of a single orifice forming a single jet.

The treatment of the element, by brazing for example, is therefore local, and in order to obtain an overall treatment over the entire periphery of the element, it is necessary to cause the torch and the element to rotate with respect to each other.

Devices have also been proposed which permit an overall treatment to be applied without rotation, but these devices generally consist of an opening ring and are of complicated construction.

The present invention has for its object a gas-flame or hot-air torch which permits, with a simple form of fork with two fixed arms, an overall treatment to be applied over the periphery of an element such as a tube or a profile section, without it being necessary to rotate the element or the torch at the same time having a convenient and economic construction with excellent conditions of working.

The torch according to the invention is characterized in that the said arms have a generally curvilinear enveloping shape with an internal wall formed by a continuous distributor which constitutes the nozzle means, the extremity of the said distributor which is remote from the said main conduit has a substantially longitudinal direction with respect to this conduit, the said arms having an outer wall in the form of a toboggan, in which the extremity remote from the said main conduit has a substantially transverse direction with respect to the said main conduit.

By virtue of this arrangement, the flow of fluid supplied through the main conduit treats the whole periphery of the element, while being substantially divided into:

1. two adjacent front portions passing through the extremity of the distributors which is adjacent to the said main conduit and acting on a front region of the element in a longitudinal direction with respect to the said main conduit;
2. two opposite rear portions which are joined together, issuing from the extremity of the distributors remote from the main conduit and acting tangentially on the rear portion of the element in a direction transverse to the said main conduit;
3. and two lateral portions passing through the assembly of the distributors and acting on the sides of the element.

The invention is applicable, inter alia, to the heating of tubes and sections, etc., and in particular permits brazing and annealing, to the treatment by hot air of plastic materials for shaping purposes, and also to all simple or multiple installations for annealing and treatment of plastic materials.

According to another characteristic feature of the invention, the extremities of the distributors which are adjacent to the main conduit are separated from each other by a full portion which prevents at that place a direct and excessive flow of fluid, and which comprises a projection forming an abutment means for limiting the engagement of the element to be treated between the two arms.

In one preferred form of embodiment, the torch is constituted by two symmetrical half-shells fixed to each other, the said half-shells comprising positioning grooves in which the distributors are placed, the said distributors being rigidly fixed to the half-shells when the latter are fixed to each other.

Each distributor may have any suitable form; in particlar in the case of a gas-flame torch, each distributor is advantageously formed by a gauze and a grid adjacent and fixed to each other. The gauze serves to prevent backfires of flame while the grid has the purpose of forming tongues of flame.

One form of embodiment of the invention will now be described below by way of example, reference being made to the accompanying drawings, in which:

FIG. 1 is a view in elevation of a torch according to the invention, with parts in section;

FIG. 2 is a front view of this torch in the direction of the arrows II—II of FIG. 1;

FIG. 3 is a view in elavation of one of the distributors comprising a gauze and a grid;

FIG. 4 is a view of this distributor in cross-section, taken along the line IV—IV of FIG. 3;

FIG. 5 illustrates the operation of the torch and shows the various jets of fluid which enable the whole of the periphery of the element, constituted in this case by a tube, to be treated;

FIG. 6 is an exploded view in perspective illustrating the assembly of the torch with two half-shells fixed to each other and positioning the two distributors in the grooves.

In the form of embodiment shown, which is concerned with an application of the invention to a torch for brazing and annealing tubes, this torch (see FIG. 1) has generally the shape of a fork with two arms comprising a main supply conduit 10 and two lateral arms 11 having nozzle means 12 for treating an element E such as a tube (see FIG. 5).

Each arm 11 has generally a curvilinear enveloping shape with an incurved internal wall 12 which is formed by a continuous distributor constituting the nozzle means. The extremity 13 of each distributor 12, which is adjacent to the main conduit 10, has a transverse direction with respect to this conduit. The extremity 14 of each distributor 12 which is remote from the main conduit 10 has a substantially longitudinal direction with respect to the conduit 10. Each arm 11 has an outer wall 15 in the shape of a toboggan, of which the extremity 16, remote from the conduit 10, has a substantially transverse direction with respect to the conduit 10.

As shown in FIG. 6, the torch is constituted by two symmetrical half-shells A and B fixed to each other by welded flanges 17. Each half-shell comprises positioning grooves 18 in which the distributors 12 are intended to be placed in such manner as to be fixed to the half-shells A and B when these latter are welded together.

Each distributor 12 (see FIGS. 3 and 4) is constituted by a wire gauze 19 and a grid 20 adjacent and rigidly fixed to each other, for example by welding. The gauze 19 has a function of preventing backfire of flame, while the grid 12, which has a series of spaced-apart openings 21 has the purpose of forming tongues of flame. The grid 20 is fixed on the downstream side of the gauze 19.

It will be noted from FIG. 1 that the extremities 13 of the distributors 12 are separated from each other by a full portion 22 which avoids at that point a direct and excessive flow of fluid coming from the main conduit 10. This full portion 22 comprises a projection 23 forming an abutment means (see FIG. 5) to limit the engagement of the element E between the two arms 11.

In operation, the flow of fluid which is supplied by the main conduit 10 (FIG. 5) is divided substantially into:
1. two adjacent rear portions (arrows C) which pass through the extremities 13 of the distributors 12 and act on the front region F of the element E in a substantially longitudinal direction with respect to the conduit 10;
2. two opposite rear portions which become joined together (arrows D) issuing from the extremities 14 of the distributors 12 and acting tangentially on the rear region P of the element E in a transverse direction with respect to the conduit 10;
3. and two lateral portions (arrows G) which pass through all the distributors 12 and act on the sides L of the element E.

It will be appreciated that in this way the flow of fluid supplied by the main conduit 10 acts on the whole periphery of the element E, both on the front F, on the rear P and on the sides L.

It will also be appreciated that the jets C provide a direct action on the front F of the element E, but without excessive flow due to the full portion 22. It will further be noted that the toboggan shape of the outer wall 15 permits the fluid to pass along this wall with an increased speed which allows the jets D to envelop completely the rear portion P of the element E. As regards the sides L of the element E, these are treated in a uniform manner over the whole length of the distributors 12.

Tests carried out with the torch which has just been described have made it possible to state that the flames which impinge on the object to be heated are not thrown back but tangentially along the object, which contributes to a very considerable use of the heat which would otherwise be lost, resulting in an excellent efficiency and very good conditions of treatment of the element E, such as tubes and sections, especially for the purpose of brazing and annealing.

The invention is applicable, not only to torches using a gas flame, but also to hot air torches for the treatment (shaping, etc.) of plastic materials and the like.

The torch according to the invention may be applied either alone or in an installation with simple or multiple torches (annealing stations, etc.).

What I claim is:

1. A gas-flame or hot-gas torch in the form of a two-armed fork device, comprising a main gas supply conduit, two lateral arms, nozzle means incorporated in said arms for applying heat around the whole periphery of an element such as a tube, section or the like engaged between said two arms, said arms each having a general curvilinear enveloping shape with an internal wall formed by a continuous gas distributor device constituting said nozzle means, the extremities of said distributors adjacent to said main gas conduit having a substantially transverse direction with respect to said conduit, while the extremities of said distributors remote from said main conduit have a substantially longitudinal direction with respect to said conduit, said arms having an external wall in the shape of a toboggan, of which the extremity remote from said main gas conduit has a substantially transverse direction with respect to said main conduit, each of said distributors being composed of an assembly of a wire gauze and a metallic grid element adjacent and rigidly fixed to each other.

2. A torch as claimed in claim 1, in which the extremities of said distributor which are adjacent to said main gas conduit are separated from each other by an unperforated full wall which prevents direct and excessive flow of supply gas at that point.

3. A torch as claimed in claim 2, in which said unperforated wall comprises a projecting portion adapted to form an abutment means for limiting the engagement of said element between said two arms.

4. A torch as claimed in claim 1, in which said curvilinear arms and said main gas supply conduit are constituted by two symmetrical half shells fixed to each other.

5. A torch as claimed in claim 4, said half shells having positioning grooves receiving said distributors in such manner that said distributors are rigidly fixed to said half shells when said half shells are fixed to each other.

* * * * *